(12) United States Patent
Szymaszek

(10) Patent No.: US 7,905,467 B2
(45) Date of Patent: *Mar. 15, 2011

(54) DUAL POSITION PILOT OPERATED VALVE ASSEMBLY

(75) Inventor: Paul G. Szymaszek, Waukesha, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/687,914

(22) Filed: Jan. 15, 2010

(65) Prior Publication Data

US 2010/0117012 A1     May 13, 2010

Related U.S. Application Data

(63) Continuation of application No. 11/367,615, filed on Mar. 3, 2006, now Pat. No. 7,677,527.

(51) Int. Cl.
*F16K 31/12* (2006.01)

(52) U.S. Cl. ............... 251/30.05; 251/30.01; 251/30.02; 251/30.03

(58) Field of Classification Search .... 251/30.01–30.03, 251/30.05, 31, 26
See application file for complete search history.

(56) References Cited

U.S. PATENT DOCUMENTS

| | | | |
|---|---|---|---|
| 2,763,130 A | 9/1858 | Henderson | |
| 1,926,076 A | 12/1927 | Whalen | |
| 2,409,517 A | 10/1946 | Schmit | |
| 2,596,036 A | 5/1952 | MacDougall | |
| 2,745,254 A | 5/1956 | Malkoff | |
| 2,748,571 A | 6/1956 | Henderson | |
| 3,741,245 A | 6/1973 | West | |
| 3,754,730 A | 8/1973 | Nilles et al. | |
| 3,896,852 A | 7/1975 | Holmes | |
| 3,944,294 A | 3/1976 | Masuda et al. | |
| 4,316,642 A | 2/1982 | Belart | |
| 4,561,464 A | 12/1985 | Frantz | |
| 5,070,707 A | 12/1991 | Ni | |
| 5,332,042 A | 7/1994 | Walter et al. | |
| 6,244,561 B1 | 6/2001 | Hansen, III et al. | |
| 6,769,744 B2 | 8/2004 | Marsh et al. | |
| 2005/0006609 A1 | 1/2005 | Fukano | |

OTHER PUBLICATIONS

Parker Hannifin Corporation—Refrigerating Specialities Division Bulletin 50-12B "Gas Powered Suction Stop Valve" Type CK-2 Mar. 2002.
Parker Hannifin Corporation—Refrigerating Specialities Division Controller Manual Rev. 14 Bulletin DF-00 Series "Defrost Controller Operating Manual" 2005.

*Primary Examiner* — John K Fristoe, Jr.
*Assistant Examiner* — Marina Tietjen
(74) *Attorney, Agent, or Firm* — Daniel J. Whitman; Robert Clark

(57) ABSTRACT

A dual position pilot operated valve assembly having a main piston, with a valve member, reciprocable within a valve body, wherein the valve body is adapted for sealingly mating with a valve seat and passage located intermediate the valve body inlet and outlet ports, the valve body having a cylindrical adapter secured to an open end thereof and housing a secondary piston, reciprocable therein, with an axial stem depending from the second piston bottom surface and extending through the adaptor to the first piston cavity for intermittent contact therewith; and an end cap secured to and closing the adapter and having an inlet port interconnected with a source of high pressure control gas and respective first and second conduits leading to the main and secondary piston bore cavities, with an adjustment mechanism controlling the degree of opening/closing of the valve assembly. Several methods of operation are also set forth.

5 Claims, 4 Drawing Sheets

DUAL POSITION PILOT OPERATED VALVE ASSEMBLY

CROSS REFERENCE TO RELATED APPLICATIONS

The present application is a continuation of U.S. Non-Provisional patent application Ser. No. 11/367,615, filed Mar. 3, 2006, which claims the benefit of the filing date of U.S. Provisional Patent Application Ser. No. 60/658,638, filed Mar. 4, 2005, the disclosure of both is incorporated herein by reference.

FIELD OF THE INVENTION

The invention pertains to a dual position pilot operated valve assembly that includes independently controllable, via high pressure gas forces, main and secondary pistons that can operate individually or in combination to close, partially open, fully open or partially close the flow path, of fluids under pressure through the valve assembly. More particularly, the valve assembly includes an adjustment mechanism intermediate the two pistons that functions to vary the degree of the partial opening and/or closing of the valve assembly.

BACKGROUND OF THE INVENTION

In the refrigeration industry particularly in the industrial refrigeration field, there remains a need to provide valving, specifically in the refrigeration evaporator configuration thereof, that opens and/or closes only part way in order to minimize, or better yet, prevent liquid hammer or vapor propelled liquid from damaging the system and causing undue piping stress.

The dual position pilot operated valve assembly of the present invention is based upon and includes the main body assembly of a known commercial gas powered suction stop valve of type CK-2 shown in Bulletin 50-12B and available from the Refrigerating Specialties Division, of the Parker Hannifin Corporation headquartered in Cleveland, Ohio, U.S.A. the CK-2 valve requires an additional solenoid of smaller capacity to be installed in parallel in order to slowly release defrost pressure from the evaporator and reduce the possibility of hydraulic shock. The noted CK-2 valve and its associated parallel solenoid suffers from the disadvantage that when an electric power failure happens to occur during a defrost cycle, the solenoids close and the main valve opens immediately, thus creating the potential for undesired hydraulic shock. While this disadvantage is also encountered in the dual position valve assembly to be described hereinafter by controlling the leakage rate around the secondary piston thereof controls the rate at which the valve assembly responds to the supply or cessation of high pressure control gas to the top of this piston. Thus, by controlling this leakage rate and/or the volume above this piston can slow the rate of response such that, incase of such a power failure the defrost cycle hydraulic hammer can be largely mitigated.

The patent literature includes a large number of valving devices that use multiple power pistons and representative ones thereof include: U.S. Pat. No. 2,596,036 to MacDougal; U.S. Pat. No. 2,745,254 to Malkoff; U.S. Pat. Nos. 2,748,571 and 2,763,130 both to Henderson; and U.S. Pat. No. 5,070,707 to Ni. However, none of these prior art structures teach or suggest the unique features of the present invention.

SUMMARY OF THE INVENTION

Accordingly, in order to overcome the deficiencies of the prior art devices, the present invention pertains to a dual position pilot operated valve assembly that includes independently controlled main and secondary pistons that can operate singly or in combination to close, partially open, fully open or partially open the valve assembly with the secondary piston structure preferably including an adjustment mechanism of varying the degree of partial opening and/or closing of the valve assembly.

Specifically, in terms of structure, this invention pertains to a dual position pilot operated valve assembly, the assembly comprising in combination: a. a main body assembly including a valve body having spaced inlet and outlet ports separated by an intermediate valve seat in open communication with the inlet and outlet ports, the valve body including a cylindrical bore portion having a first piston bore cavity; a first piston reciprocable within the valve body bore portion, the first piston including an axial bleed hole and a valve member forming a lower portion thereof and being adapted to sealingly mate with the valve seat during one operative mode of the valve assembly; and a biasing member for normally biasing the valve member away from the valve seat; b. a generally cylindrical adapter secured to an open end of the valve housing bore portion, the adapter including a cylindrical bore portion having a second piston bore cavity; a second piston reciprocable within the adapter bore portion, including a central axial stem depending from a bottom surface of the second piston and extending into and through the adapter cylindrical bore portion to the first piston bore cavity for contracting the first piston during at least one operative mode of the valve assembly; c. a closure secured to an open end of the adapter; d. a source of high pressure gas; e. a first conduit operatively and controllably interconnecting the source of high pressure gas with the first piston bore cavity; and f. a second conduit operatively and controllably interconnecting the source of high pressure gas with the second piston bore cavity.

In one version the second piston further includes a sleeve member peripherally and axially adjustably secured to the depending stem.

In a variation of the previous version, the second piston further includes at least one shim interposed between the second piston bottom surface and a top surface of the sleeve member. In another variation the at least one shim is included in a shim stack interposed between the second piston bottom surface and the sleeve member top surface.

In another version the second piston further includes at least one shim interposed between a base of the stem and an adjoining stepped surface of the sleeve member.

In a further version the closure takes the form of an end cap having an inlet port connected with the source of high pressure gas and the valve assembly further includes spaced first and second control valves attached to a side surface of the end cap, having respective inlet ports operatively interconnected with the end cap inlet port, with the first control valve including a first controllable outlet port and the second control valve including a second controllable outlet port. In a variation thereof the control valves are solenoid valves.

In yet a differing version the adapter cylindrical bore is a stepped bore, with the central axial stem extending into and through the stepped bore for an axial extent depending upon the axial location of the second piston within the adaptor bore portion.

A second embodiment of the present invention pertains to a dual position pilot operated valve assembly for use in a refrigeration system evaporator configuration to minimize the liquid hammer effect at the termination of a hot gas defrost cycle the assembly comprising in combination: a. a body assembly including: a valve body having an inlet port and a spaced outlet port, separated via an intermediate valve seat in open communication with the inlet and outlet ports; the valve body including a cylindrical bore portion having a main piston bore cavity; a main piston reciprocable within the bore portion; the main piston including an axial through bleed hole and a valve member secured to a lower portion thereof, adapted to sealingly mate with the valve seat; and a biasing member for normally axially biasing the main piston and valve member away from the valve seat; b. a generally cylindrical adapter, secured to an open end of the valve housing bore portion, the adapter including a stepped cylindrical bore portion having a secondary piston bore cavity; a secondary piston, reciprocable within the stepped bore portion, including a central axial stem, depending stem and extending into and through the stepped cylindrical bore portion to the main piston bore cavity; and at least one shim interposed between one of the secondary piston bottom surface and a base of the stem, and an annular lower surface of the sleeve member, for varying the axial extent of the sleeve member relative to the bottom surface; c. an end cap secured to an open end of the cylindrical adapter and closing an outer end of the adapter stepped bore portion; and d. spaced first and second solenoid valves, attached to a side surface of the end cap, having respective inlet ports operatively interconnected with an inlet port in the end cap, with the end cap, in turn, being operatively interconnected with a source of high pressure gas; the first solenoid valve having an outlet port operatively interconnected with a primary piston conduit terminating into the main piston bore cavity; the second solenoid valve having an outlet port operatively interconnected with a secondary piston conduit terminating into the secondary piston bore cavity.

In one version thereof, the at least one shim is included in an interposed shim stack.

Another version in the dual position pilot operated valve assembly of the previous embodiment, pertains to a method for moving the valve assembly from a fully open position to a fully closed position, durian the defrosting cycle, the method including the steps of: a. channeling high pressure gas, from the first solenoid valve to the main piston bore cavity, thereby overcoming the opposing bias of the biasing member and axially displacing the main piston to its lowest vertical position and causing the valve member to physically abut and sealingly mate with the valve seat; and b. simultaneously channeling high pressure gas from the second solenoid valve, to the secondary piston bore cavity thereby axially displacing the secondary piston to its lowest vertical position and causing a lower surface of the sleeve portion to approach an upper surface of the main piston.

A further version, in the dual position pilot operated valve assembly of the second embodiment pertains to a method for further moving the valve assembly from the fully closed position to an partially open position, during the defrosting cycle, the method including the steps of: a. continuing the channeling of high pressure fluid, from the second solenoids valve, to the secondary piston bore cavity thus causing the lower surface of the sleeve portion to continue to keep the secondary piston at its lowest vertical position; and b. stopping the channeling of high pressure gas, from the first solenoid valve, to the main piston bore cavity with bleed-off of the high pressure gas from the main piston bore cavity lowering the gas pressure therein to a value below that exerted by the opposing biasing member, thereby axially upwardly displacing the main piston until the main piston upper surface physically abuts the sleeve member lower surface, thereby causing the valve member to be axially displaced for a predetermined distance away from the valve seat. In a variation thereof, the method for moving the valve assembly from the fully closed position to the partially open position further includes the initial step of adjusting the axial extent of the sleeve member, relative to one of the secondary piston bottom surface and the base of the stem.

A differing version in the dual position pilot operated valve assembly of the second embodiment pertains to a method for further moving the valve assembly from a partially open position to a fully open position, at the conclusion of the defrosting cycle, the method including the steps of: a. continuing stopping the channeling of high pressure fluid from the first solenoid valve to the secondary piston cavity; and b. also stopping the channeling of high pressure gas from the second solenoid valve to the secondary piston bore cavity with bleed-off of the high pressure gas from the secondary piston bore cavity thus lowering the gas pressure therein to a value below that exerted by the opposing biasing member thereby further axially upwardly displacing the main piston until its physically abuts the sleeve member lower surface and thereafter axially displaces the secondary piston until the main piston upper surface abuts a lower surface of the cylindrical adapter thereby fully opening the valve assembly.

In yet another version of the second embodiment in order to move the valve assembly from a fully open position to a fully closed position as part of the defrosting cycle high pressure gas is channeled to both the main piston and secondary piston bore cavities via the primary and secondary conduits respectively, thereby causing the pistons to move axially to their lowest position with the pressure gas in the main piston bore cavity thus overcoming the opposing force of the biasing member and causing the valve member to sealingly mate with the valve seat.

In a variation of the above version in order to move the valve assembly from the fully closed position to a partially open position as part of the defrosting cycle high pressure gas is channeled only into the secondary piston bore cavity with bleed-off of the high pressure gas in the main piston bore cavity lowering the pressure therein to a value below that exerted by the opposing biasing member thereby axially upwardly displacing the main piston until it abuts the sleeve member thereby causing the valve member to be axially displaced for a predetermined distance from the valve seat and partially open the valve assembly. In addition the degree of the partial opening of the valve assembly is varied by adjustment of the axial extent of the sleeve member relative to one of the secondary piston bottom surface and the base of the stem. Furthermore, the adjustment includes one of the insertion and deletion of shims in the shim stack.

In a further variation of the previous version in order to move the valve assembly from the partially open position to a fully open position as part of the defrosting cycle all channeling of high pressure gas into the main and secondary piston bore cavities is stopped with bleed-off of high pressure gas from the secondary piston cavity thus lowering the gas pressure therein to a value below that exerted by the opposing biasing member thereby axially upwardly displacing the main piston until it physically abuts the sleeve member lower surface and thereafter displaces the secondary piston until the main piston upper surface abuts a lower surface of the cylindrical adapter, thereby fully opening the valve member.

The previously described advantages and features as well as other advantages and features will become readily apparent from the detailed description of the preferred embodiments that follow.

DETAILED DESCRIPTION OF THE INVENTION

Figure 1:
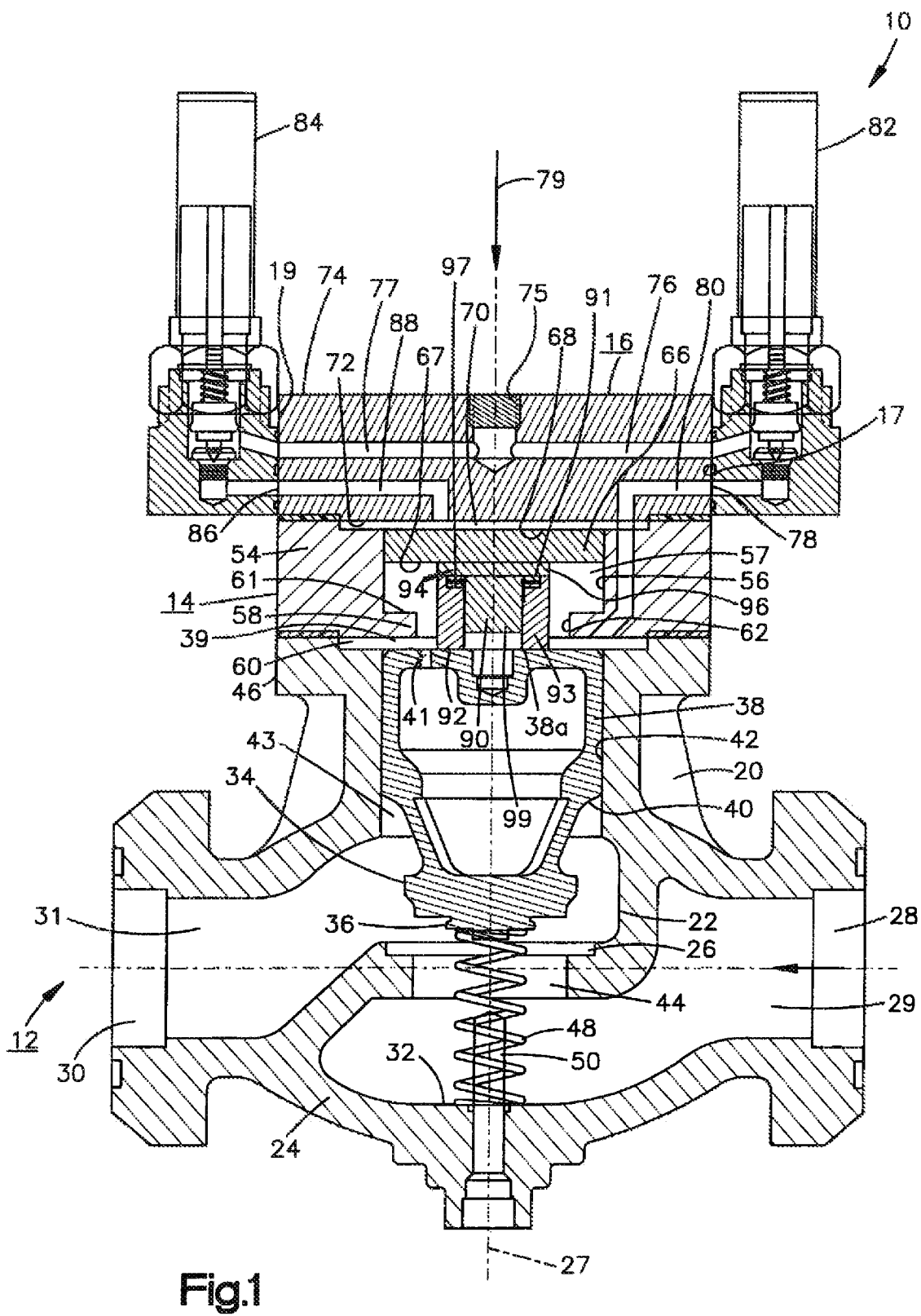
FIG. 1 is a vertical, central, cross-sectional view of the dual position pilot operated valve assembly in accordance with the present invention illustrating the movable parts of the valve assembly arranged in the fully open position.
Figure 4:
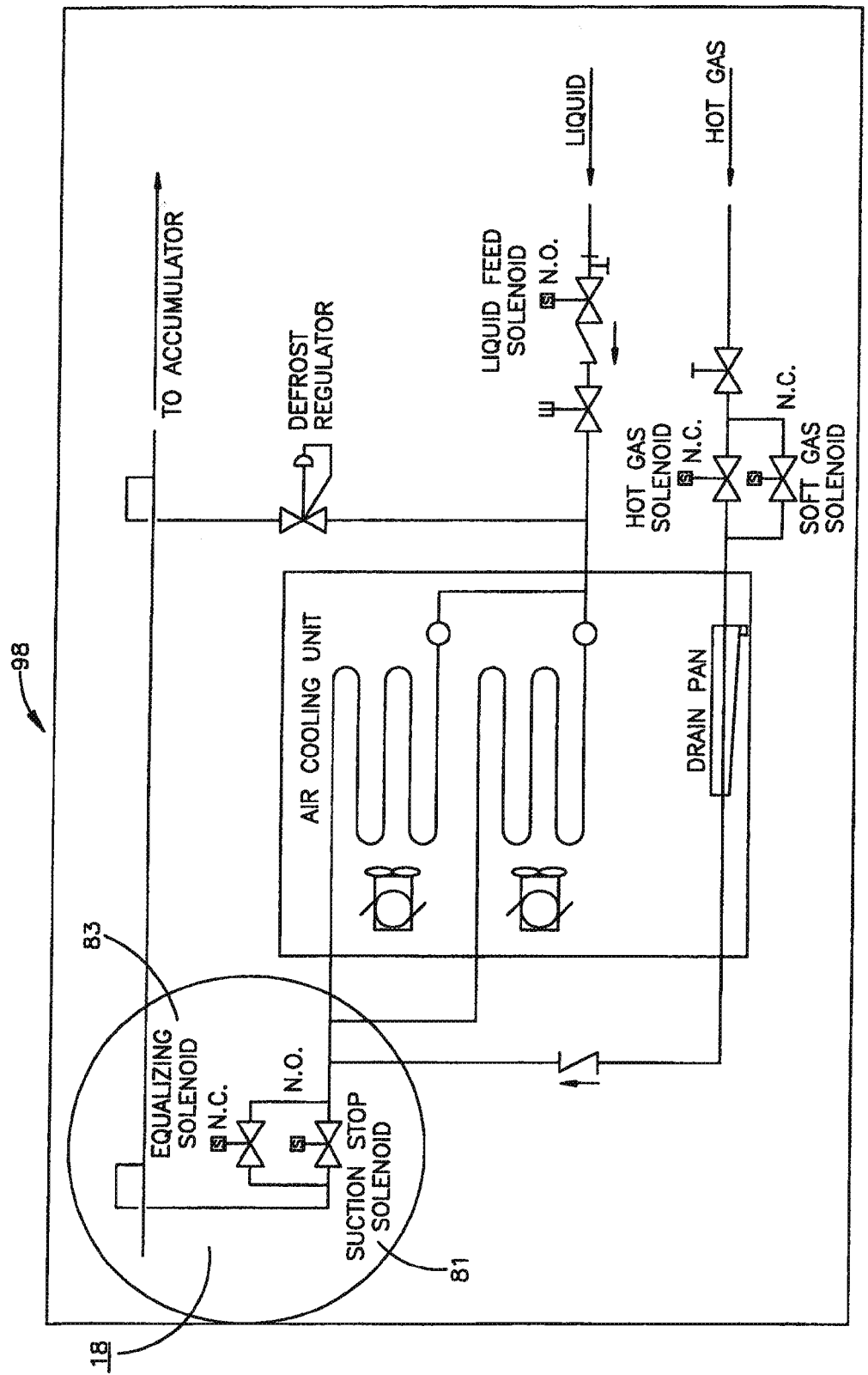
FIG. 4 is a schematic view of a typical refrigeration system evaporator configuration in which, for example, the dual position pilot operated valve assembly of the present invention is utilized.

Referring now the several drawings illustrated in FIG. 1 is a vertical, cross-sectional view of the dual position pilot operated valve assembly of the present invention generally indicated at 10, which is designed and constructed to prevent the usual liquid-hammer effect at the termination of a hot gas defrost step or cycle when valve assembly 10 is utilized, for example, in circled area 18 of the typical refrigeration system evaporator configuration shown in FIG. 4.

Specifically, valve assembly 10 includes the body assembly 12 of a known, commercial, gas powered suction stop valve, type CK-2, shown in previously noted Bulletin 50-12B and available from the Refrigerating Specialties Division of the Parker Hannifin Corporation of Cleveland, Ohio, U.S.A., which has been modified by the addition of an adapter portion 14 and an end cap or closure 16, all of which will be described in more detail hereinafter.

FIG. 1 illustrates the movable internal parts thereof arranged in the fully open position of valve assembly 10, with CK-2 body assembly 12 including a generally cylindrical upper body portion 20 that has, at a lower end 22 thereof, a fixed, integral, generally circular valve seat 26 that is interposed, in a horizontal, lower, body portion 24, between a first or inlet opening 28 in an inlet conduit 29, and an opposed, second or outlet opening 30 in an outlet conduit 31, with horizontal body portion 24 and its openings 28 and 30 being generally perpendicular to valve seat 26 and major axis 27 of upper vertical body portion 20. Main piston 38 includes an axial bleed hole 41, of a predetermined diameter, that extends through its crown portion 38 and whose function will be detailed later. Housed within body portion 20 is a generally cylindrical valve member 34 fixedly secured to the lower skirt surface 40 of a generally cylindrical first or main piston 38 adapted to reciprocate within a closely fitting cylindrical bore 42 of body portion 20. It should be understood, at this time, that valve member 34, in conjunction with valve seat 26 controls the opening and closing of a passage 44 between inlet opening 28 and outlet opening 30. Traversing inlet conduit 28, between a depending locating ridge 36 on the lower outer surface of valve member 34 and an inside bottom surface 32 of inlet conduit 29, is an opening compression spring 48 that normally biases valve member 34 to the open position illustrated in FIG. 1. A manual opening stem 50 extends into the major axis of spring 48 and can be manually threaded, through inlet conduit 29, so as to be able to make physical contact, when so desired, with the lower surface of valve member 34, at ridge 36, in a manner well known in the art.

As illustrated in FIG. 1, when valve assembly 10 is in its fully open position, the upper, outer, peripheral surface 39 of main piston 38 is substantially coplanar with and abuts or adjoins a lower, annular surface 60 of generally cylindrical adapter 14, with adapter 14 including a generally cylindrical housing 54 having a central cylindrical bore 56, a lower and radially inwardly directed circular end portion 58, having noted lower surface 60, an upper annular surface 61 and a central vertical aperture 62. Adapter housing 54 is preferably removably attached to an upper radial flange portion 46 of body portion 20 via a plurality of preferably evenly peripherally-spaced, axially-directed fasteners (not shown).

Adaptor 14 houses a secondary or auxiliary piston 66 within adaptor housing bore 56, with piston 66 having a diameter substantially similar to that of primary piston 38 and being adapted to reciprocate within closely fitting bore 56 between a lower position (FIG. 2), wherein its piston bottom or lower circular surface 67 abuts upper annular surface 61 of adapter lower end portion 58, and an upper position (FIG. 1), wherein a piston upper circular surface 68 of piston crown 70 substantially abuts or adjoins an inner circular surface 72 of end cap 16, with end cap 16 further including an outer circular end surface 74 as well as a radially directed secondary piston port 78 and an adjoining primary piston passage or conduit 80 leading into main piston bore cavity 43. End cap 16 is preferably removably attached to adapter housing 54 in any desired manner. In addition, end cap 16 is also provided with a radially directed primary piston port 86 and an adjoining secondary piston passage or conduit 88 leading into adapter housing secondary piston bore cavity 57. Attached to opposite side surfaces 17 and 19 of end cap 16 are respective first and second solenoid valves 82, 84, of known construction and function, with solenoid valve 82 being operatively interconnected with primary piston passage 80 and a conduit 76, in end cap 16, leading to a central inlet port 75 that is, in turn, connected with a source of high pressure gas 79. In a similar manner, solenoid valve 84 is operatively interconnected with secondary piston passage 88 and a conduit 77, also in end cap 16, and high pressure gas source 79. Solenoid valves 82, 84 thus control the flow of high pressure gas to cavities 43 and 57. It should be understood that solenoid valves 82, 84 are shown in their actual operating positions, depending upon the operative position of valve assembly 10, in each of FIGS. 1-3, and function, when energized, to allow fluid flow from valve assembly inlet portion 28 to outlet portion 30.

Furthermore, secondary piston 66 is provided with a central axial stem or actuating pin 90 that is externally threaded and depends from piston bottom surface 67 and freely extends into and through central aperture 62 of adapter housing lower end portion 58 to a varying extent, depending, of course, upon the axial position of secondary piston 66 within cylindrical bore 56. Stem 90 is threadably connected with a peripherally extending, internally threaded, sleeve or nut member 93. Interposed, between secondary piston bottom surface 67 and a top surface 94 of sleeve member 93, is a shim stack 96 (only one shim being illustrated), with the varying of the numbers and thicknesses of the individual shims in shim stack 96 of course varying the axial position of a bottom surface 92 of sleeve member 93 and thereby the degree or amount of the opening of valve 10 in a manner to be explained later. A radial aperture 95, in sleeve member 93, is adapted to receive a set screw (not shown) to prevent sleeve member 93 from turning and thus altering the degree of opening of valve assembly 10. It should be understood that if the degree or amount of the partial opening or closing of valve 10 does not need to be adjusted, then shim stack 96 and sleeve member 93 are not required, with a bottom surface 99 of stem 90 then being the surface that makes contact with primary piston top or upper surface 39.

Figure 2:
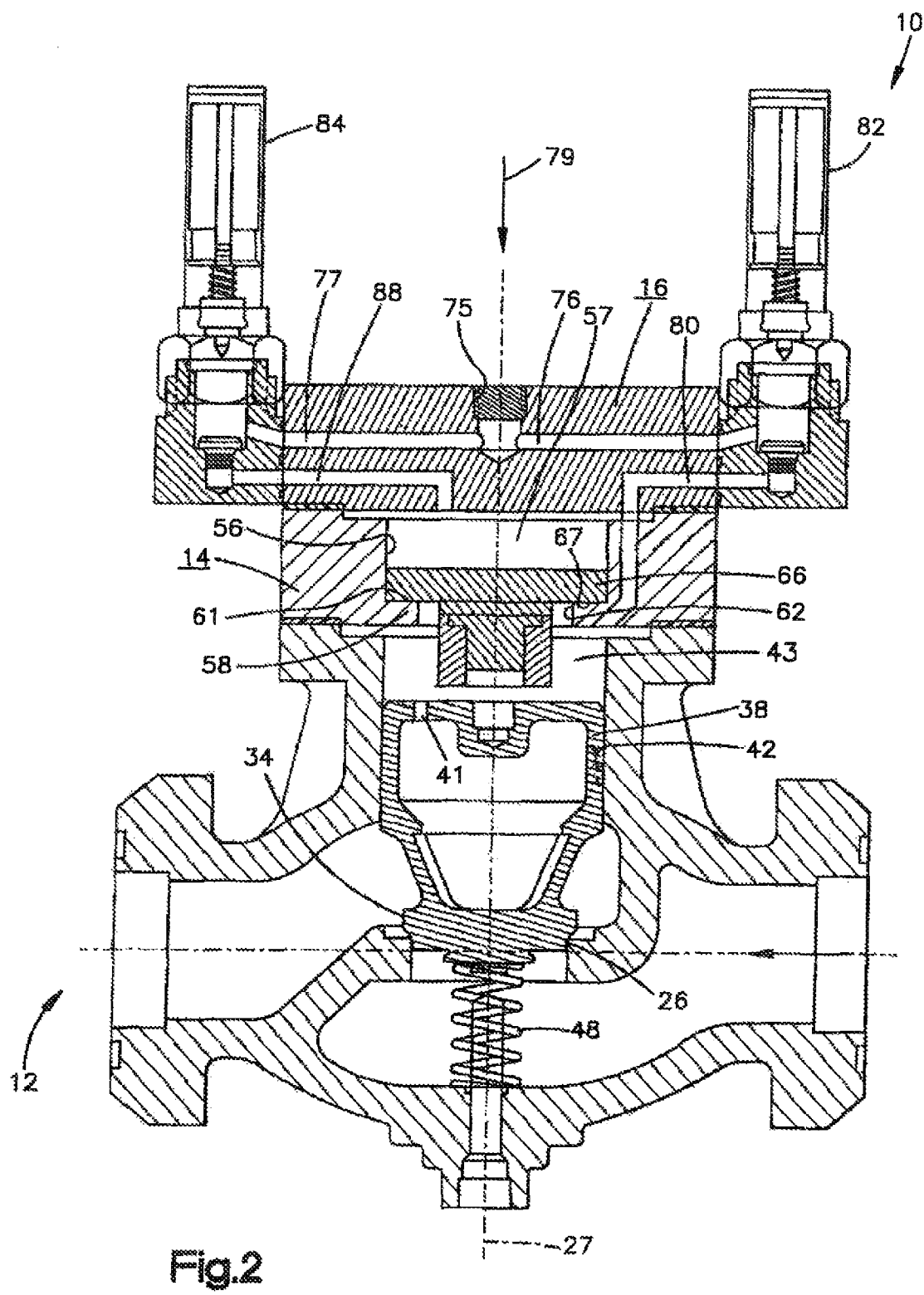
FIG. 2 is a view similar to that of FIG. 1 but illustrating the movable parts of the valve assembly in a fully closed position.

In terms of the operation of valve assembly 10, referring first to FIG. 2, which illustrates the movable components of valve assembly in the fully closed position, during the defrosting step, high pressure hot gas is applied to both chambers/cavities 43 and 57 above first and secondary pistons 38 and 66, via conduits 88 and 80, respectively. The high gas pressure above lower or primary piston 38 axially moves or vertically displaces piston 38 so as to close main valve 10 by reason of valve member 34 physically contacting valve seat 26. The high gas pressure above primary piston 38 creates enough force to overcome the biasing force of spring 48 below primary piston 38. The flow of high pressure gas into chamber 43, above primary piston 38, is sufficient to overcome the gas leakage through axial bleed hole 41, in primary piston 38, as well as the gas leakage through the annular area between piston 38 and cylindrical bore surface 42 of body portion 20. The high gas pressure above upper or secondary piston 66 axially moves or vertically displaces secondary piston 66 down to the inner surface 61 of adapter lower portion 58. Since there is no bleed hole or aperture in secondary piston 66, the gas leakage through the annular area between secondary piston 66 and bore 56 is limited by the seal between bottom surface 67, of secondary piston 66, and the inner surface 61 of adapter lower portion 58. The slightly lower gas pressure, due to the aforementioned gas leakage, in chamber 43, above primary piston 38, insures that secondary piston 66 is at its lowest vertical position.

Figure 3:
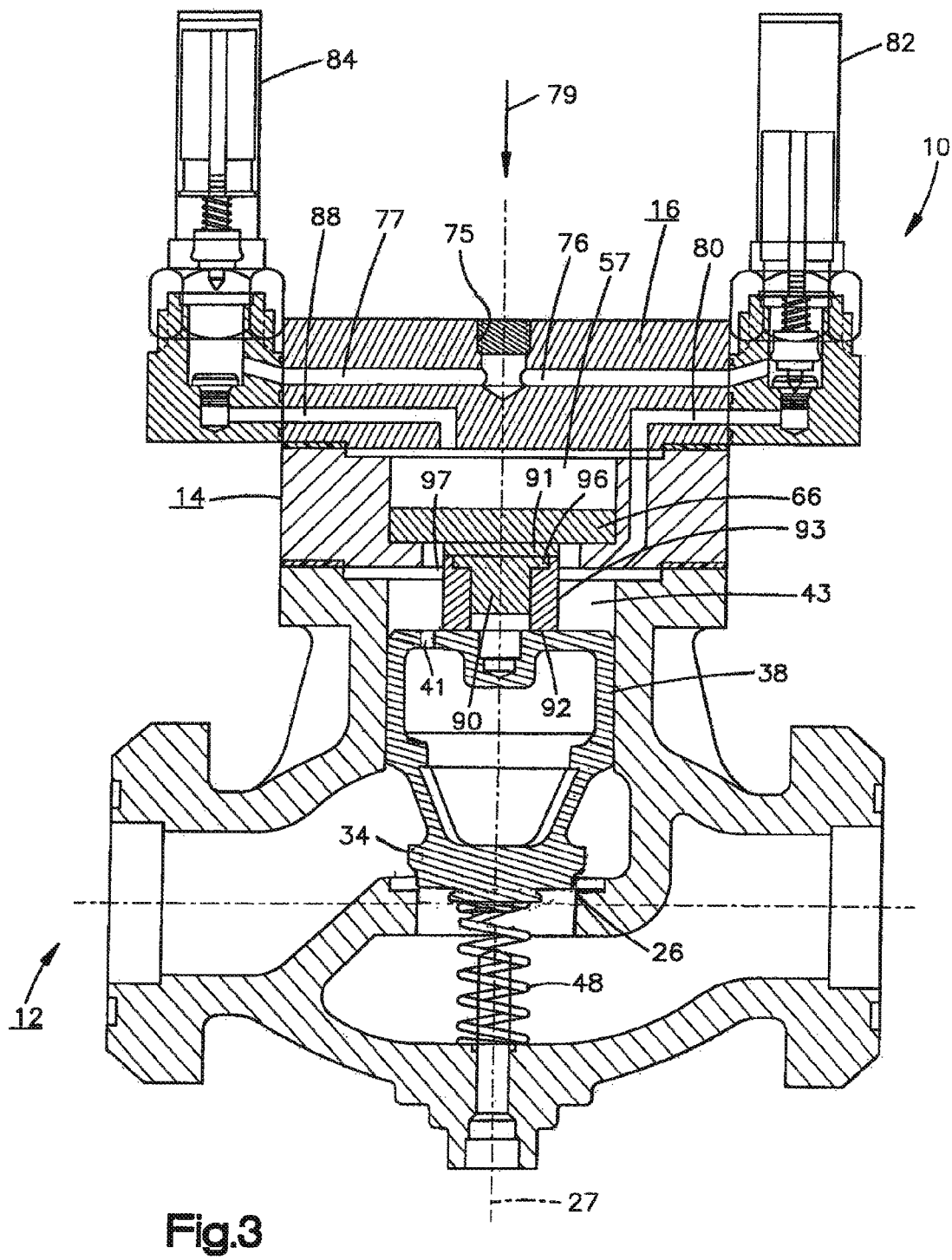
FIG. 3 is a view again similar to that of FIG. 1, but illustrating the movable parts of the valve assembly in a partly open position.

Turning now to FIG. 3, which illustrates the movable parts or components of valve assembly 10 in its partially open position, at the conclusion of the defrosting step, the feeding of high pressure gas into primary piston chamber 43 is stopped while the feeding of high pressure gas into secondary piston chamber 57 is maintained. Thus, secondary piston 66 remains in its fully down or lowest vertical position. With very little gas leaking into primary piston chamber 43 and the residual high pressure gas leaking through bleed hole or aperture 41 as well as the annular area around main piston 38, the gas pressure in cavity 43, above primary piston 38, is reduced to such a value that the pressure force of spring 48, below primary piston 38, overcomes the fluid pressure force above primary piston 38 and thus piston 38 moves up to contact bottom surface 92 of secondary piston sleeve member 93, thus axially upwardly displacing valve member 34 for a predetermined distance away from valve seat 26 thereby partially opening valve 10. As previously noted, by varying the number and thicknesses of the individual shims of shim stack 96, this consequently varies the position of central sleeve member bottom surface 92 and thereby the degree of opening of valve assembly 10. As an alternative, shim stack 96 could also be interposed between base 91 of stem 90 and an adjoining stepped surface 97 of sleeve member 93. Thus, shim stack 96 can act as a manual adjustment mechanism for controlling the degree of partial opening of valve 10, as previously described and explained.

Returning now to FIG. 1, which illustrates the movable parts of valve assembly 10 in the fully open position, relative to the FIG. 3 partly open position of valve 10, the feeding of high pressure gas to secondary piston chamber 57 is now also stopped, resulting in slight leakage of this high pressure gas, from cavity 57, through the annular area of bore 56 around secondary piston 66 and the area between secondary piston bottom surface 67 and inner surface 61 of adapter lower end portion 58. After a predetermined period of time and resulting leak down, the force of spring 48, below primary piston 38, causes piston 38 to act against secondary piston sleeve member 93, resulting in primary piston 38 to be axially displaced until its top surface 39 contacts bottom surface 66 of adapter 14. The contact of primary piston 38 with sleeve member 93 also results in the axial displacement of secondary piston 66 until its upper surface 68 contacts end cap inner surface 72.

Thus, both pistons 38 and 66 reach their highest vertical position, thereby ensuring that valve assembly 10 is in its fully open position.

Turning finally to FIG. 4, it sets forth a schematic 98 of a known, typical refrigeration system evaporator configuration, such as set forth and specifically discussed on page 19 of the DF-00 Series Defrost Controller Operating Manual, © 2005, of the previously noted Parker Hannifin Refrigerating Specialties Division. Therein, for example, the dual position pilot operated valve assembly 10 of the present invention finds utility. Specifically, in circled area 18, valve assembly 10 can replace both of the shown prior art suction stop solenoid valve 81 and the prior art equalizing solenoid valve 83, illustrated therein. FIG. 4 prior art solenoid valves 81, 83, are piped remotely and at least one thereof is much larger than solenoid valves 82, 84 utilized in the present invention.

One disadvantage of the previously noted commercial gas powered suction stop valve, of the type CK-2, and a parallel solenoid is that if an electric power failure occurs during a defrost cycle, the solenoids close and the main valve opens immediately thus providing the potential for undesired hydraulic shock. While this disadvantage is also encountered with dual position pilot operated valve assembly 10 of the present invention, the leakage rate around secondary piston 66 controls the response rate at which valve assembly 10 responds to the supply or cessation of high pressure gas to the top thereof. Thus, by controlling this leakage rate and/or the volume above secondary piston 66, the noted response rate can be slowed or reduced in the event of an electrical power failure, during the defrost cycle, so as to substantially mitigate the undesired shock potential.

It should thus be understood at this time that the utilization of dual position pilot operated valve assembly 10, by reason of its opening and/or closing only part way, prevents or at least mitigates liquid hammer or vapor propelled liquid at the termination of a hot gas defrost step in a refrigeration cycle operation.

The principle of utilizing two pistons, as shown and described, can be applied to any pilot operated piston valve assembly regardless of whether the valve assembly is normally closed or normally open and can also be used to partially close, prior fully closing, the valve assembly, in addition to the noted partially opening, prior to fully opening, the valve assembly, in the manner set forth herein.

It is deemed that one of ordinary skill in the art will readily recognize that the present invention fills remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A refrigeration valve for a refrigeration system evaporator configuration, the valve comprising:
   a valve body having spaced inlet and outlet ports separated by an intermediate valve seat in open communication with the inlet and outlet ports;
   a first piston reciprocable within a bore in the valve body, the piston including a valve member being adapted to sealingly mate with the valve seat, the piston including a bleed hole through a portion of the first piston providing a fluid pathway connecting the valve body outlet port to the bore in the valve body;
   an adapter body secured to an open end of the bore in the valve body;

a second piston reciprocable within a bore in the adapter body, the second piston having a portion adapted to extend into the bore in the valve body;

an end cap positioned adjacent the adapter body on a side opposite the valve body;

an inlet connectable to a source of high pressure gas;

a first conduit extending at least partially through the end cap and the adapter body, fluidly connecting the source of high pressure gas to the bore in the valve body;

a second conduit extending at least partially through the end cap, fluidly connecting the source of high pressure gas to the bore in the adapter body;

a first solenoid assembly attached to the end cap or the adapter and moveable to open and close the first conduit; and a second solenoid assembly attached to the end cap or the adapter and moveable to open and close the second conduit;

the first and second solenoid being selectively activated and deactivated alone or in unison to make the valve operate in a predetermined operating condition, the predetermined operating condition including a first operating condition wherein the valve is fully open, a second operating condition wherein the valve is fully closed, and a third operating condition wherein the valve is partially open and a portion of the second piston engages the first piston to hold the first piston in the partially open position.

2. The valve of claim 1, wherein the inlet is positioned in the end cap.

3. The valve of claim 1, wherein the portion of the second piston adapted to extend into the bore in the valve body for contacting the first piston has an axial length that is adjustable.

4. The valve of claim 1 further comprising a means for biasing the first piston toward at least one of a valve open or a valve closed position.

5. The valve of claim 1, wherein the valve is either a normally open or a normally closed valve.

* * * * *